United States Patent
Yuan et al.

(10) Patent No.: US 10,373,308 B2
(45) Date of Patent: Aug. 6, 2019

(54) SLICED IMAGE PROCESSING METHOD AND THREE-DIMENSIONAL PRINTING APPARATUS

(71) Applicants: XYZprinting, Inc., New Taipei (TW); Kinpo Electronics, Inc., New Taipei (TW)

(72) Inventors: Kuo-Yen Yuan, New Taipei (TW); Ko-Wei Shih, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 249 days.

(21) Appl. No.: 15/644,846

(22) Filed: Jul. 10, 2017

(65) Prior Publication Data

US 2018/0336673 A1 Nov. 22, 2018

(30) Foreign Application Priority Data

May 19, 2017 (CN) .......................... 2017 1 0356076

(51) Int. Cl.
*B29C 64/386* (2017.01)
*B29C 64/393* (2017.01)
(Continued)

(52) U.S. Cl.
CPC .......... *G06T 7/0004* (2013.01); *B29C 64/386* (2017.08); *B29C 64/393* (2017.08); *B33Y 50/00* (2014.12); *B33Y 50/02* (2014.12); *G05B 19/4099* (2013.01); *G06T 7/13* (2017.01); *G06T 7/60* (2013.01); *G06T 7/62* (2017.01);
(Continued)

(58) Field of Classification Search
CPC ..... B29C 64/386; B29C 64/393; B33Y 50/00; B33Y 50/02; G05B 19/4099; G05B 2219/49023; G06T 7/0004; G06T 7/13; G06T 7/60; G06T 7/62; G06T 19/00;
(Continued)

(56) References Cited

U.S. PATENT DOCUMENTS

2016/0133050 A1 5/2016 Sakurai et al.
2016/0288425 A1 10/2016 Yoshida
2016/0288426 A1 10/2016 Yoshida

OTHER PUBLICATIONS

Volpato et al. (A process planning applicative for rapid prototyping technology, Proc. of the 18th International Congress of Mechanical Engineering, Nov. 6-11, 2005) (Year: 2005).*

(Continued)

*Primary Examiner* — Yubin Hung
(74) *Attorney, Agent, or Firm* — JCIPRNET (57) ABSTRACT

The invention provides a sliced image processing method including following steps: analyzing a sliced object in a sliced image to determine whether the sliced object has a first contour line segment and a nearest second contour line segment, where the second contour line segment is located within a region encircled by the first contour line segment; determining whether vector directions of the first contour line segment and the second contour line segment are opposite when the sliced object has the first contour line segment and the second contour line segment, and correcting the vector direction of at least one of the first contour line segment and the second contour line segment when the vector directions of the first contour line segment and the second contour line segment are not opposite.

18 Claims, 7 Drawing Sheets (51) Int. Cl.
- *B33Y 50/02* (2015.01)
- *G06T 7/62* (2017.01)
- *G06T 7/00* (2017.01)
- *G06T 7/60* (2017.01)
- *G06T 19/00* (2011.01)
- *G06T 19/20* (2011.01)
- *B33Y 50/00* (2015.01)
- *G06T 7/13* (2017.01)
- *G05B 19/4099* (2006.01)

(52) U.S. Cl.
CPC .............. *G06T 19/00* (2013.01); *G06T 19/20* (2013.01); *G05B 2219/49023* (2013.01); *G06T 2207/10028* (2013.01); *G06T 2207/30108* (2013.01); *G06T 2219/2021* (2013.01)

(58) Field of Classification Search
CPC ........... G06T 19/20; G06T 2207/10028; G06T 2207/30108; G06T 2219/2021
See application file for complete search history.

(56) References Cited

OTHER PUBLICATIONS

Volpato et al. (A new 2D Inner/Outer Contour Identification Method for Layer Manufacturing, Virtual and Rapid Prototyping—Bártolo et al. (eds) 2007) (Year: 2007).*

Volpato et al. ("The development of a generic rapid prototyping process planning system," in Innovative Developments in Design and Manufacturing: Advanced Research in Virtual and Rapid Prototyping—Bártolo et al. (eds), CRC Press, London, 2009) (Year: 2009).*

Singhal et al. ("Adaptive Slicing for SLS Prototyping," Computer-Aided Design and Applications, Aug. 2013) (Year: 2013).*

"Search Report of Europe Counterpart Application", dated Apr. 11, 2018, p. 1-7.

Volpato N et al., "Identifying the directions of a set of 2D contours for additive manufacturing process planning", International Journal of Advanced Manufacturing Technology Springer-Verlag London LTD. UK , Sep. 2013, pp. 33-43.

* cited by examiner

SLICED IMAGE PROCESSING METHOD AND THREE-DIMENSIONAL PRINTING APPARATUS

CROSS-REFERENCE TO RELATED APPLICATION

This application claims the priority benefit of China application serial no. 201710356076.1, filed on May 19, 2017. The entirety of the above-mentioned patent application is hereby incorporated by reference herein and made a part of this specification.

BACKGROUND OF THE INVENTION

Field of the Invention

The invention relates to an image processing technique, and particularly relates to a sliced image processing method and a three-dimensional printing apparatus.

Description of Related Art

During a process of printing a three-dimensional (3D) object, a general 3D printing apparatus may implement a printing operation layer-by-layer according to a plurality of sliced images, and in the printing operation of each layer, the 3D printing apparatus may color a sliced object. In a general case, the 3D printing apparatus has to first determine whether a contour line segment of the sliced object belongs to an outer contour or a hole contour, so as to implement the printing operation at a position of the outer contour of the sliced object. Namely, it is an important issue to provide a method capable of effectively determining and correcting a contour determination result of the sliced object in the sliced image, so as to implement the correct printing operation on the sliced object.

SUMMARY OF THE INVENTION

The invention is directed to a sliced image processing method and a three-dimensional (3D) printing apparatus, which are adapted to effectively determine and correct a contour of a sliced object in a sliced image, such that the 3D printing apparatus executes a correct printing operation to a 3D model.

The invention provides a sliced image processing method including following steps: analyzing a sliced object in a sliced image to determine whether the sliced object has a first contour line segment and a nearest second contour line segment, where the second contour line segment is located within a region encircled by the first contour line segment; determining whether vector directions of the first contour line segment and the second contour line segment are opposite when the sliced object has the first contour line segment and the second contour line segment, and correcting the vector direction of at least one of the first contour line segment and the second contour line segment when the vector directions of the first contour line segment and the second contour line segment are not opposite.

In an embodiment of the invention, the vector directions of the first contour line segment and the second contour line segment are respectively a first direction and a second direction, and the corrected first direction is one of a clockwise direction and an anticlockwise direction, and the corrected second direction is the other one of the clockwise direction and the anticlockwise direction.

In an embodiment of the invention, the first contour line segment and the second contour line segment are respectively closed line segments, and the step of determining whether the vector directions of the first contour line segment and the second contour line segment are opposite includes: analyzing the first contour line segment and the second contour line segment to obtain a plurality of first sub line segment vectors of a plurality of first sub line segments and a plurality of second sub line segment vectors of a plurality of second sub line segments; and integrating a connecting sequence of vector directions of the first sub line segment vectors to form a first direction, and integrating a connecting sequence of vector directions of the second sub line segment vectors to form a second direction.

In an embodiment of the invention, the sliced image processing method further includes following steps: defining the first contour line segment as an outermost contour of the sliced object when the region encircled by the first contour line segment includes the second contour line segment; and determining whether the first direction is one of the clockwise direction and the anticlockwise direction, and re-defining the vector directions of the first sub line segment vectors when the first direction is not one of the clockwise direction and the anticlockwise direction.

In an embodiment of the invention, the sliced image processing method further includes following steps: defining the second contour line segment as a hole contour of the sliced object when the second contour line segment is located within the region encircled by the first contour line segment; and determining whether the second direction is the other one of the clockwise direction and the anticlockwise direction to determine whether to re-define the vector directions of the second sub line segment vectors; and re-defining the vector directions of the second sub line segment vectors when the second direction is not the other one of the clockwise direction and the anticlockwise direction.

In an embodiment of the invention, the sliced image processing method further includes following steps: analyzing a 3D object to construct a 3D model image, where the 3D model image is complied with a stereolithography file format; and slicing a 3D model in the 3D model image to obtain the sliced image.

In an embodiment of the invention, the 3D model in the 3D model image is composed of a plurality of triangular planes, and the triangular planes respectively have a plurality of corresponding surface vectors, where the step of analyzing the sliced object in the sliced image includes: determining the vector directions of the first sub line segment vectors according to the surface vectors of the triangular planes of the 3D model respectively corresponding to the first sub line segments; and determining the vector directions of the second sub line segment vectors according to the surface vectors of the triangular planes of the 3D model respectively corresponding to the second sub line segments.

In an embodiment of the invention, the sliced image processing method further includes following steps: analyzing the sliced object in the sliced image to determine whether the sliced object has a plurality of second contour line segments located within the region encircled by the first contour line segment; determining whether the vector directions of the first contour line segment and the second contour line segments are alternately changed between the clockwise direction and the anticlockwise direction when the sliced object has the second contour line segments, and the second contour line segments surround each other one-by-one; and correcting the vector direction of at least one of the first contour line segment and the second contour line segments when the vector directions of the first contour line segment and the second contour line segments are not alternately changed between the clockwise direction and the anticlockwise direction.

In an embodiment of the invention, the sliced image processing method further includes following steps: analyzing the sliced object in the sliced image to determine whether the sliced object has a plurality of second contour line segments located within the region encircled by the first contour line segment; determining whether the vector direction of the first contour line segment is respectively opposite to the vector directions of the second contour line segments when the sliced object has the second contour line segments, and the second contour line segments are separated from each other without surrounding; and correcting the vector direction of at least one of the first contour line segment and the second contour line segments when the vector directions of the first contour line segment and at least one of the second contour line segments are not opposite.

The invention provides a 3D printing apparatus including a storage device and a processor. The storage device is used for storing a sliced image and a plurality of modules. The processor is coupled to the storage device. The processor is used for executing the modules to: analyze a sliced object in the sliced image to determine whether the sliced object has a nearest first contour line segment and a second contour line segment, where the second contour line segment is located within a region encircled by the first contour line segment; determine whether vector directions of the first contour line segment and the second contour line segment are opposite when the sliced object has the first contour line segment and the second contour line segment, and determine whether to correct the vector direction of at least one of the first contour line segment and the second contour line segment when the vector directions of the first contour line segment and the second contour line segment are not opposite.

In an embodiment of the invention, the vector directions of the first contour line segment and the second contour line segment are respectively a first direction and a second direction, and the corrected first direction is one of a clockwise direction and an anticlockwise direction, and the corrected second direction is the other one of the clockwise direction and the anticlockwise direction.

In an embodiment of the invention, the first contour line segment and the second contour line segment are respectively closed line segments, and the processor analyzes the first contour line segment and the second contour line segment to obtain a plurality of first sub line segment vectors of a plurality of first sub line segments and a plurality of second sub line segment vectors of a plurality of second sub line segments. The processor integrates a connecting sequence of vector directions of the first sub line segment vectors to form a first direction, and integrates a connecting sequence of vector directions of the second sub line segment vectors to form a second direction.

In an embodiment of the invention, when the region encircled by the first contour line segment includes the second contour line segment, the processor defines the first contour line segment as an outermost contour of the sliced object, and the processor determines whether the first direction is one of the clockwise direction and the anticlockwise direction. When the first direction is not one of the clockwise direction and the anticlockwise direction, the processors determines whether to re-define the vector directions of the first sub line segment vectors.

In an embodiment of the invention, when the second contour line segment is located within the region encircled by the first contour line segment, the processor defines the second contour line segment as a hole contour of the sliced object, and the processor determines whether the second direction is the other one of the clockwise direction and the anticlockwise direction. When the second direction is not the other one of the clockwise direction and the anticlockwise direction, the processor re-defines the vector directions of the second sub line segment vectors.

In an embodiment of the invention, the processor further executes the modules to: analyze a 3D object to construct a 3D model image, where the 3D model image is complied with a stereolithography file format; and slice a 3D model in the 3D model image to obtain the sliced image.

In an embodiment of the invention, the 3D model in the 3D model image is composed of a plurality of triangular planes, and the triangular planes respectively have a plurality of corresponding surface vectors, where the operation of analyzing the sliced object in the sliced image includes: determining the vector directions of the first sub line segment vectors according to the surface vectors of the triangular planes respectively corresponding to the first sub line segments; and determining the vector directions of the second sub line segment vectors according to the surface vectors of the triangular planes of the 3D model respectively corresponding to the second sub line segments.

In an embodiment of the invention, the processor further executes the modules to: analyze the sliced object in the sliced image to determine whether the sliced object has a plurality of second contour line segments located within the region encircled by the first contour line segment; determine whether the vector directions of the first contour line segment and the second contour line segments are alternately changed between the clockwise direction and the anticlockwise direction when the sliced object has the second contour line segments, and the second contour line segments surround each other one-by-one; and correct the vector direction of at least one of the first contour line segment and the second contour line segments when the vector directions of the first contour line segment and the second contour line segments are not alternately changed between the clockwise direction and the anticlockwise direction.

In an embodiment of the invention, the processor further executes the modules to: analyze the sliced object in the sliced image to determine whether the sliced object has a plurality of second contour line segments located within the region encircled by the first contour line segment; determine whether the vector direction of the first contour line segment is respectively opposite to the vector directions of the second contour line segments when the sliced object has the second contour line segments, and the second contour line segments are separated from each other without surrounding; and correct the vector direction of at least one of the first contour line segment and the second contour line segments when the vector directions of the first contour line segment and at least one of the second contour line segments are not opposite.

According to the above description, the sliced image processing method and the 3D printing apparatus of the invention may effectively determine the contour line segments of the sliced object in the sliced image, and may correct the vector directions of a plurality of sub line segments of the contour line segments, such that the 3D printing apparatus may correctly determine whether the contour line segments of the sliced object belong to the outer contours or the hole contours. Therefore, the sliced image processing method and the 3D printing apparatus of the invention may provide good printing effect.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

A term "couple" used in the full text of the disclosure (including the claims) refers to any direct and indirect connections. Wherever possible, components/members/steps using the same referential numbers in the drawings and description refer to the same or like parts. Components/members/steps using the same referential numbers or using the same terms in different embodiments may cross-refer related descriptions.

Figure 1:
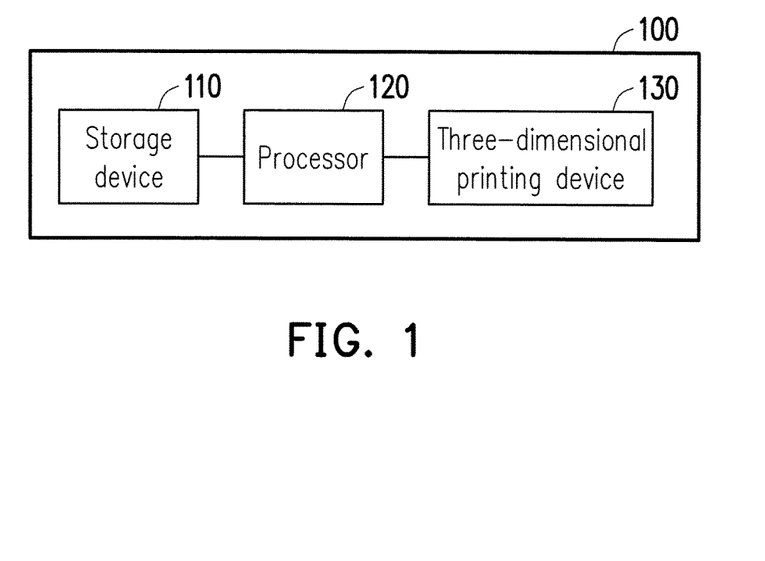
FIG. 1 is a schematic diagram of a 3D printing apparatus according to an embodiment of the invention.

FIG. 1 is a schematic diagram of a 3D printing apparatus according to an embodiment of the invention. Referring to FIG. 1, the 3D printing apparatus 100 includes a storage device 110, a processor 120 and a 3D printing device 130. The processor 120 is coupled to the storage device 110 and the 3D printing device 130. In the present embodiment, the processor 120 is used for modelling a 3D object, so as to construct a 3D model image, where the 3D model image complied with a STereoLithography (STL) file format. A 3D model in the 3D model image of the STL file format is composed of a plurality of triangular grids, and each of the triangular grids has three terminals, and the terminals respectively have different coordinates. However, in an embodiment, if the 3D model image is not a 3D file of the triangular grids, for example, an object file format or a polygon file format (PLY), the processor 120 may triangularize the grids thereof, and fit a polygon or curved surface through a plurality sets of triangles. In the present embodiment, the processor 120 may perform a slice operation to the 3D model in the 3D model image to obtain at least one sliced image. Moreover, the processor 120 may control the 3D printing device 130 to perform a 3D printing operation according to the sliced images, so as to drive the 3D printing device 130 to print a 3D object layer-by-layer.

In the present embodiment, the storage device 110 can be used for storing data and can be a buffer memory, an internal storage medium, an external storage medium, other types of storage devices or a combination of the above devices. For example, the buffer memory may include a random access memory (RAM), a read only memory (ROM) or other similar devices. For example, the internal storage medium may include a hard disk drive (HDD), a solid state disk, a flash storage device or other similar devices. For example, the external storage medium may include an external HDD, a USB driver, a cloud HDD or other similar devices. In the present embodiment, the storage device 110 can be used for storing the 3D model image, a plurality of sliced images, a 3D image modelling module, an image processing module or an image analyzing module, etc., so as to implement a sliced image processing task of each of the embodiments of the invention.

In the present embodiment, the processor 120 can be used for executing a plurality of modules stored in the storage device 110, so as to implement image processing and image analyzing tasks of each embodiment of the invention. The processor 120 can be a central processing unit (CPU), or other programmable general purpose or special purpose microprocessor, a digital signal processor (DSP), a programmable controller, an application specific integrated circuits (ASIC), a programmable logic device (PLD), other similar devices or a combination of these devices.

In the present embodiment, the 3D printing device 130 may include a controller, a printing head and a platform, etc. The processor 120 may provide a control signal to a controller of the 3D printing device 130 according to the sliced image, so as to drive the 3D printing device 130. The 3D printing device 130 may control the printing head to perform a 3D printing operation on the platform. In the present embodiment, the 3D printing operation includes feeding a forming material. Moreover, those skilled in the art should understand that the 3D printing device 130 may also include other components used for commonly implementing the 3D printing operation together with the printing head (for example, a supply pipe line, a printing head linkage mechanism, etc.), and descriptions thereof are omitted.

Figure 2:
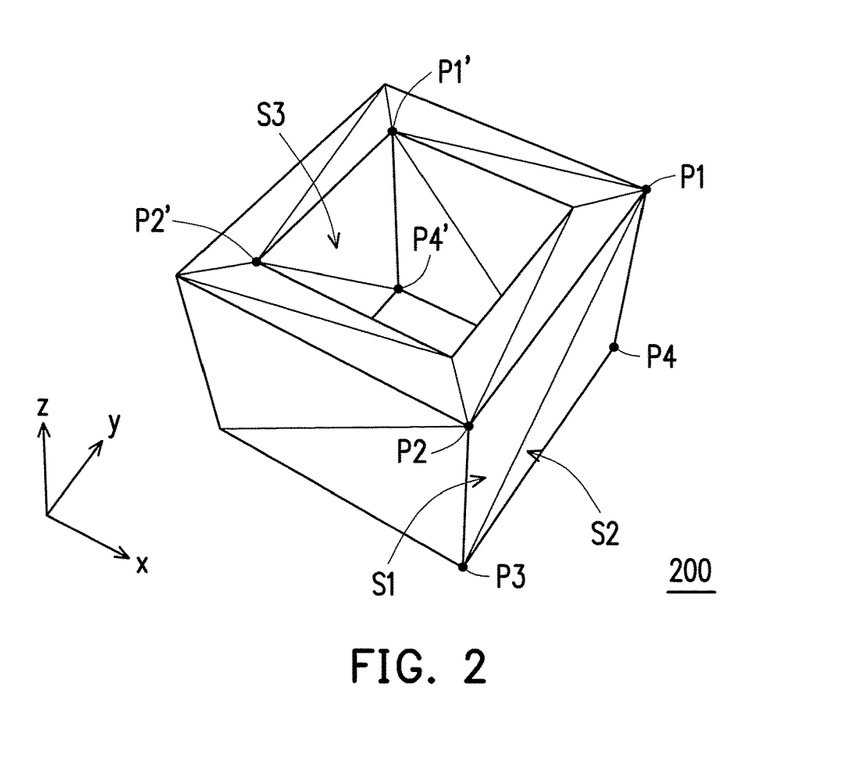
FIG. 2 is a schematic diagram of a 3D model image according to an embodiment of the invention.
Figure 3A:
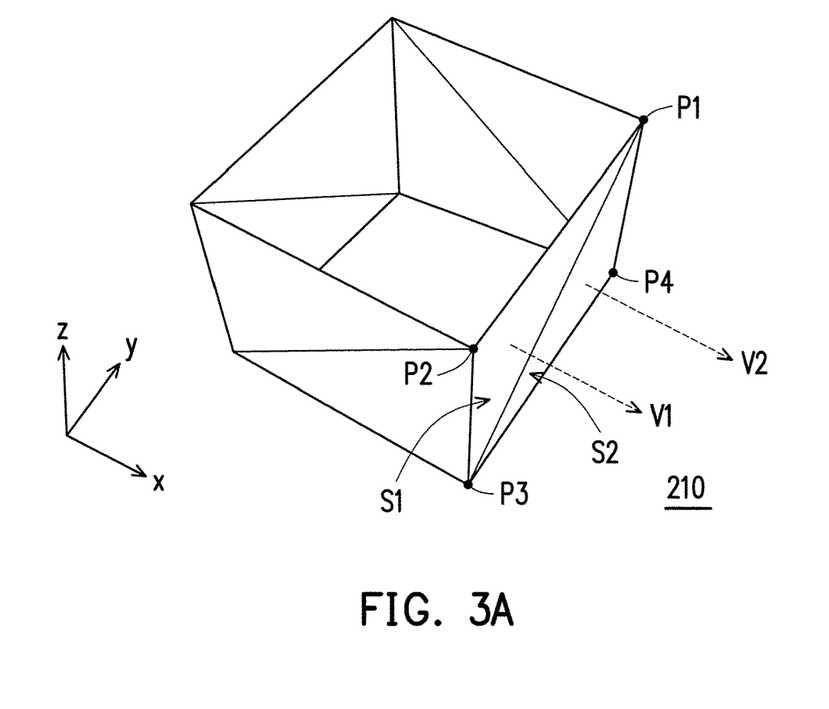
FIG. 3A is a schematic diagram of an outermost contour of the embodiment of FIG. 2 according to an embodiment of the invention.
Figure 3B:
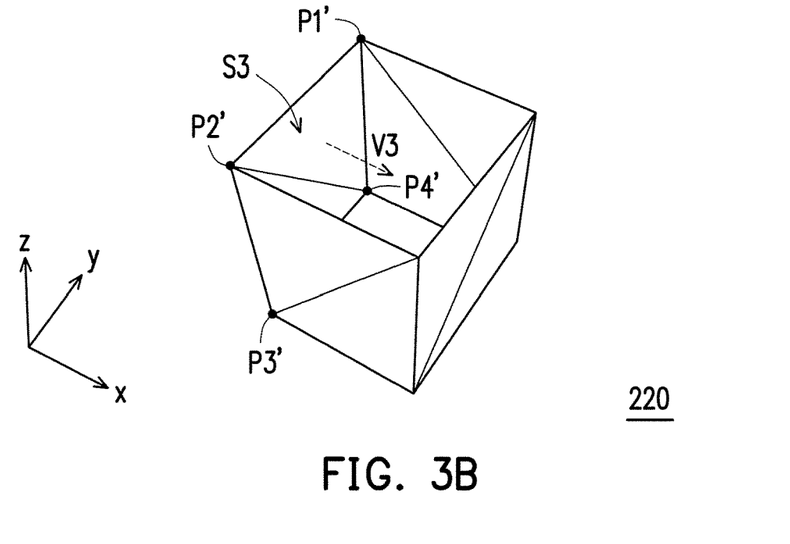
FIG. 3B is a schematic diagram of a hole contour of the embodiment of FIG. 2 according to an embodiment of the invention.

FIG. 2, FIG. 3A and FIG. 3B provide an exemplary embodiment to describe the 3D model image mentioned in the embodiments of the invention.

FIG. 2 is a schematic diagram of a 3D model image according to an embodiment of the invention. Referring to FIG. 1 and FIG. 2, the processor 120 may execute the 3D image modelling module stored in the storage device 110 to construct a 3D model image shown in FIG. 2. In the present embodiment, a 3D model 200 in the 3D model image is composed of triangular planes of a plurality of triangular grids, so as to present a 3D image. For example, a triangular plane structure formed by endpoints P1, P2 and P3 can be used for describing a triangular plane S1 of the 3D model 200. Another triangular plane structure formed by endpoints P1, P3 and P4 can be used for describing another triangular plane S2 of the 3D model 200. Another triangular plane structure formed by endpoints P1', P2' and P4' can be used for describing another triangular plane S3 of the 3D model 200. In the present embodiment, the endpoints P1-P4, P1'-P4' respectively have different coordinate parameters used for describing position and vector information thereof, and description of other endpoints and the triangular planes on the 3D model 200 can be deduced by analogy.

In the present embodiment, since enough instructions and recommendations for a method of defining a surface vector of each of the triangular grids of the 3D model image of the STL file format can be learned from common knowledge of the field, detailed description thereof is not repeated. Moreover, a shape of the 3D mode 200 of the 3D model image of the present embodiment is not limited to the shape shown in FIG. 2, and positions of the endpoints on the 3D model 200 are not limited to the positions shown in FIG. 2. In an embodiment, a contour of the 3D mode 200 can be any polygon contour, which is composed of a plurality of the same or different polygon planes, though the invention is not limited thereto.

FIG. 3A is a schematic diagram of an outermost contour of the embodiment of FIG. 2 according to an embodiment of the invention. FIG. 3B is a schematic diagram of a hole contour of the embodiment of FIG. 2 according to an embodiment of the invention. Referring to FIG. 2 and FIG. 3A, the outermost contour 210 of the 3D model 200 can be composed of a plurality of triangular planes. Taking the triangular plane S1 as an example, regarding the triangular plane S1 formed by the endpoints P1, P2 and P3, a vector direction of a surface vector V1 can be defined through a sequence of the coordinate parameters of each of the endpoints. Taking the triangular plane S2 as an example, regarding the triangular plane S2 formed by the endpoints P1, P3 and P4, a vector direction of a surface vector V2 can be defined through a sequence of the coordinate parameters of each of the endpoints. Referring to FIG. 2 and FIG. 3B, the hole contour 220 of the 3D model 200 can be composed of a plurality of triangular planes. Taking the triangular plane S3 as an example, regarding the triangular plane S3 formed by the endpoints P1', P2' and P4', a vector direction of a surface vector V3 can be defined through a sequence of the coordinate parameters of each of the endpoints.

Namely, the 3D model 200 of the present embodiment may have the outermost contour and the hole contour, and the processor may record a plurality of endpoint coordinate parameters and the surface vectors of each of the triangular planes of the outermost contour and the hole contour of the 3D model 200. Is should be noted that the surface vectors V1, V2, V3 of the triangular planes S1, S2, S3 of the present embodiment can also be sorted according to right hand rule, so as to define the vector directions of the surface vectors V1, V2, V3 of the triangular planes S1, S2, S3, though the invention is not limited thereto.

FIG. 4, FIG. 5A, FIG. 5B and FIG. 6 provide an exemplary embodiment to describe the sliced image mentioned in the embodiments of the invention.

Figure 4:
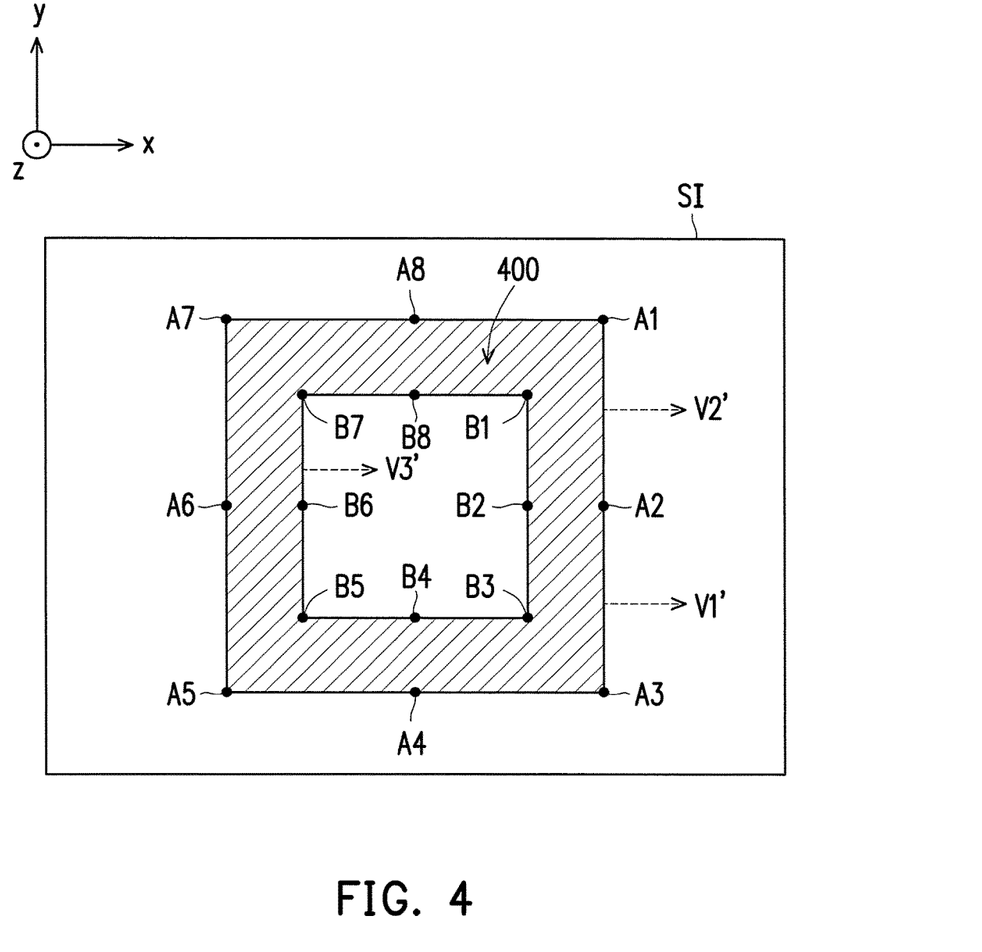
FIG. 4 is a schematic diagram of a sliced image according to an embodiment of the invention.

FIG. 4 is a schematic diagram of a sliced image according to an embodiment of the invention. Referring to FIG. 1, FIG. 2 and FIG. 4, the processor 120 may perform a slice operation to the 3D model 200 of FIG. 2 to obtain a sliced image SI. In the present embodiment, the sliced image SI is a surface image of the 3D model 200 in an x-y plane. The sliced image SI has a sliced object 400. In the present embodiment, the sliced object 400 has an outermost contour and a hole contour. The sliced image SI includes a plurality of endpoints A1-A8 and B1-B8. In the present embodiment, a connection line from the endpoint A1 to the endpoint A8 can be used for representing a first contour line segment of the sliced object 400, and a connection line from the endpoint B1 to the endpoint B8 can be used for representing a second contour line segment of the sliced object 400. However, a structure of the sliced image SI of the present embodiment is not limited to the structure shown in FIG. 4. In an embodiment, the sliced object 400 may only have the outermost contour without the hole contour. Alternatively, in another embodiment, the sliced object 400 may have a plurality of outer contours and a plurality of hole contours, and the outer contours and the hole contours are configured in interleaving.

In the present embodiment, the processor 120 may record the surface vector information of each of the triangular planes of the 3D model 200, so that after the processor 120 performs a layer-slicing processing to the 3D model 200, each sub line segment of the first contour line segment and the second contour line segment of the sliced object 400 of the sliced image SI obtained by the processor 120 may respectively have corresponding vector information. For example, the sub line segment between the endpoint A1 and the endpoint A2 may correspond to the surface vector V2 of the triangular plane S2 of the 3D model image 200, so that the processor 120 may record that the sub line segment between the endpoint A1 and the endpoint A2 have vector information of a normal vector V2'. The sub line segment between the endpoint A2 and the endpoint A3 may correspond to the surface vector V1 of the triangular plane S1 of the 3D model image 200, so that the processor 120 may record that the sub line segment between the endpoint A2 and the endpoint A3 have vector information of a normal vector V1'. The sub line segment between the endpoint B6 and the endpoint B7 may correspond to the surface vector V3 of the triangular plane S3 of the 3D model image 200, so that the processor 120 may record that the sub line segment between the endpoint B6 and the endpoint B7 have vector information of a normal vector V3'. Moreover, description of other sub line segments between the endpoints on the 3D model image 200 can be deduced by analogy, and detail thereof is not repeated.

It should be noted that when the 3D printing apparatus 100 executes the 3D printing operation, the 3D printing device 130 feeds materials according to the information of the sliced object of the sliced image SI. Therefore, the 3D printing apparatus 100 of the present embodiment analyzes a contour of the sliced object in each sliced image to correctly determine whether the contour line segment of the sliced object belongs to the outer contour or the hole contour.

In the present embodiment, each of the sub line segments of the first contour line segment of the sliced object 400 obtained by the processor 120 through the layer-slicing processing has normal vector information facing outwards the contour or facing inwards the contour. Similarly, each of the sub line segments of the second contour line segment of the sliced object 400 obtained by the processor 120 through the layer-slicing processing has normal vector information facing outwards the contour or facing inwards the contour. Namely, the normal vector information of each of the sub line segments of the first contour line segment and the second contour line segment of the sliced object 400 is already fixed when the 3D model is constructed. Therefore, the processor 120 of the present embodiment is used for determining whether the sliced object 400 has the first contour line segment and the nearest second contour line segment, where the second contour line segment is located within a region encircled by the first contour line segment.

Since the normal vector information of the outer contour is opposite to that of the hole contour (the normal vector of the outer contour facing outwards, and the normal vector of the hole contour facing inwards), the processor 120 of the present embodiment accordingly determines whether vector directions of the first contour line segment and the nearest second contour line segment are opposite, so as to determine whether to correct the vector direction of at least one of the first contour line segment and the second contour line segment, such that the 3D printing apparatus 100 may correctly execute the printing operation.

However, in an embodiment, each sub line segment of a same contour line segment probably has an error in construction of the 3D model, which results in a fact that the normal vectors of one or a plurality of sub line segments of the same contour line segment probably have errors. Therefore, when the processor 120 performs the layer-slicing processing, the processor 120 may also determine the normal vectors of each of the sub line segments of the same contour line segment, so as to ensure whether the normal vectors of each of the sub line segments of the same contour line segment have the same normal vector information facing outwards the contour or facing inwards the contour.

To be specific, in the present embodiment, the processor 120 may first analyze the sliced object 400 in the sliced image SI to determine whether the sliced object 400 has the first contour line segment (a connection line from the endpoint A1 to the endpoint A8) and the second contour line segment (a connection line from the endpoint B1 to the endpoint B8) located within the region encircled by the first contour line segment. In the present embodiment, when the processor 120 determines that the sliced object 400 has the first contour line segment and the second contour line segment, the processor 120 further analyzes the first contour line segment and the second contour line segment to obtain a plurality of first sub line segment vectors of the first contour line segment and a plurality of second sub line segment vectors of the second contour line segment. Then, the processor 120 further integrates a plurality of vector directions sequentially connected between the endpoint A1 to the endpoint A8 to form the first direction, and integrates a plurality of vector directions sequentially connected between the endpoint B1 to the endpoint B8 to form the second direction. The processor 120 determines whether the first direction is opposite to the second direction to determine whether to correct the vector direction of the first contour line segment or the second contour line segment. It should be noted that in the present embodiment, if the processor 120 corrects the vector direction of the first contour line segment or the second contour line segment, the corrected first direction is one of a clockwise direction and an anticlockwise direction, and the corrected second direction is the other one of the clockwise direction and the anticlockwise direction.

In the present embodiment, if a range encircled by the connection line from the endpoint A1 to the endpoint A8 includes a range encircled by the connection line from the endpoint B1 to the endpoint B8, the processor 120 determines the connection line from the endpoint A1 to the endpoint A8 to be the outermost contour of the sliced object 400. In other words, if the range encircled by the connection line from the endpoint B1 to the endpoint B8 is located within the range encircled by the connection line from the endpoint A1 to the endpoint A8, the processor 120 determines the connection line from the endpoint B1 to the endpoint B8 to be the hole contour of the sliced object 400.

In order to fully convey the technical means and implementations for correcting a contour direction of the sliced object in the sliced image to those skilled in the art, in the following description, the first direction is defined as the anticlockwise direction, and the second direction is defined as the clockwise direction, though the invention is not limited thereto.

Figure 5A:
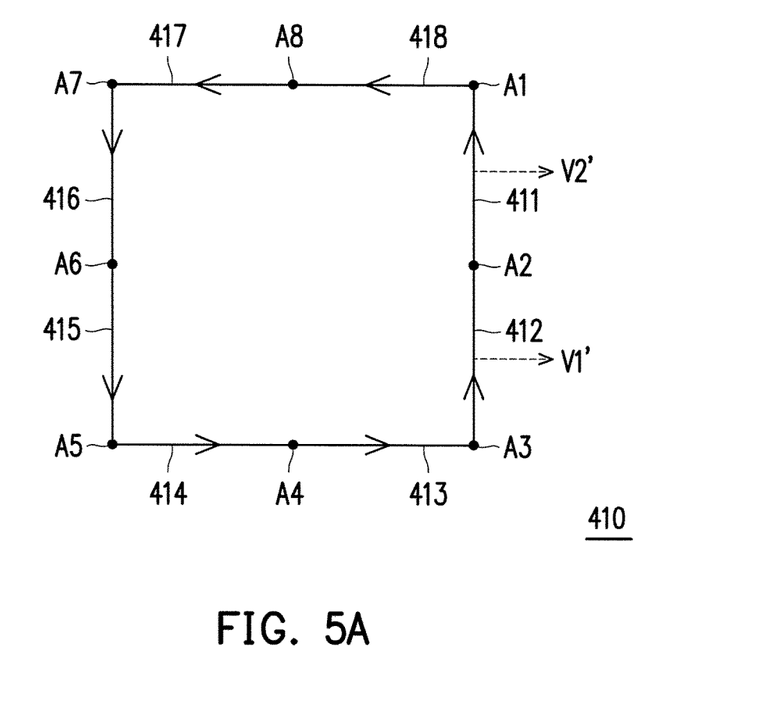
FIG. 5A is a schematic diagram of a first contour line segment of a sliced image of the embodiment of FIG. 4 according to an embodiment of the invention.
Figure 5B:
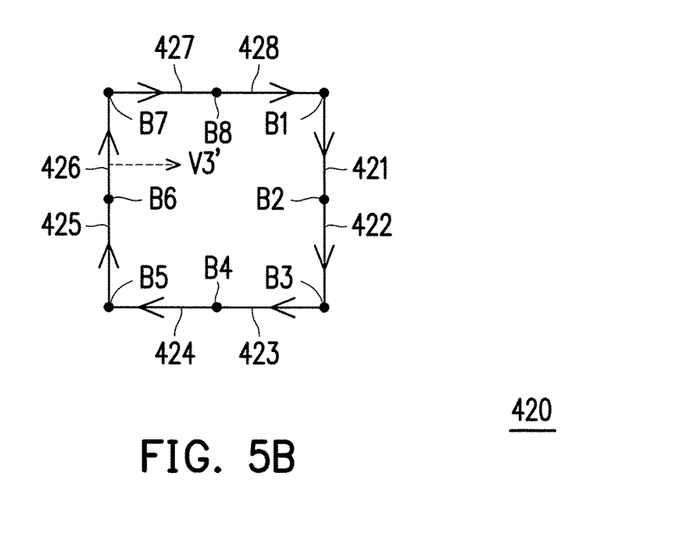
FIG. 5B is a schematic diagram of a second contour line segment of the sliced image of the embodiment of FIG. 4 according to an embodiment of the invention.

To be specific, FIG. 5A is a schematic diagram of the first contour line segment of the sliced image of the embodiment of FIG. 4. FIG. 5B is a schematic diagram of the second contour line segment of the sliced image of the embodiment of FIG. 4. Referring to FIG. 1, FIG. 4 and FIG. 5A, the processor 120 determines whether a first contour line segment 410 is the outermost contour of the sliced object 400. The processor 120 may analyze the sliced object 400 in the sliced image SI to obtain the first contour line segment 410 (the connection line of the endpoints A1-A8), where the first contour line segment 410 includes a plurality of first sub line segments 411-418. The processor 120 may analyze the first sub line segments 411-418 to obtain a plurality of first sub line segment vectors (shown in FIG. 5A) respectively corresponding to the first sub line segments 411-418, where the first sub line segment vectors are respectively used for representing distance and direction information between each of the endpoints. For example, the processor 120 may rotate the normal vector V2' of the line segment between the endpoint A1 and the endpoint A2 anticlockwise by 90 degrees to obtain a vector direction of the first sub line segment 411. The processor 120 may rotate the normal vector V1' of the line segment between the endpoint A2 and the endpoint A3 anticlockwise by 90 degrees to obtain a vector direction of the first sub line segment 412. Deduced by analogy, the vector directions of the first sub line segments 411-418 can be deduced through the normal vectors corresponding to each of the sub line segments.

In the present embodiment, the processor 120 may integrate the vector directions of the first sub line segments 411-418, and determine whether the vector directions of the first sub line segments 411-418 form the anticlockwise direction, so as to determine whether to re-define the vector directions of the first sub line segments 411-418. Namely, if the vector directions of the first sub line segments 411-418 form the clockwise direction, the processor 120 may correct the vector directions of the first sub line segments 411-418, such that the vector directions of the first sub line segments 411-418 form the anticlockwise direction. Therefore, the 3D printing apparatus 100 of the present embodiment may avoid a following situation: when the processor 120 executes an operation of constructing the 3D model, if the processor 120 misjudges or wrongly defines a surface vector direction of each of the triangular planes of the outermost contour of the 3D model 200, it causes a whole definition error of the vector directions of the first sub line segments 411-418. In other words, when the processor 120 of the present embodiment determines the outermost first contour line segment of the sliced object 400 for the first time, the processor 120 may actively correct the vector direction of the first contour line segment of the sliced image SI to the anticlockwise direction, such that the 3D printing device 130 may correctly print a position of the outermost contour of the sliced object 400.

Referring to FIG. 1, FIG. 4 and FIG. 5B, the processor 120 determines whether a second contour line segment 420 is the hole contour of the sliced object 400. The processor 120 may analyze the sliced object 400 in the sliced image SI to obtain the second contour line segment 420 (the connection line of the endpoints B1-B8), where the second contour line segment 420 includes a plurality of second sub line segments 421-428. The processor 120 may analyze the second sub line segments 421-428 to obtain a plurality of second sub line segment vectors (shown in FIG. 5B) respectively corresponding to the second sub line segments 421-428, where the second sub line segment vectors are respectively used for representing distance and direction information between each of the endpoints. For example, the processor 120 may rotate the normal vector V3' of the line segment between the endpoint B6 and the endpoint B7 anticlockwise by 90 degrees to obtain a vector direction of the second sub line segment 426. Deduced by analogy, the vector directions of the second sub line segments 421-428 can be deduced through the normal vectors of each of the sub line segments.

In the present embodiment, the processor 120 may integrate the vector directions of the second sub line segments 421-428, and determine whether the vector directions of the second sub line segments 421-428 form the clockwise direction, so as to determine whether to re-define the vector directions of the second sub line segments 421-428. Namely, if the vector directions of the second sub line segments 421-428 form the anticlockwise direction, the processor 120 may correct the vector directions of the second sub line segments 421-428, such that the vector directions of the second sub line segments 421-428 form the clockwise direction. Therefore, the 3D printing apparatus 100 of the present embodiment may avoid a following situation: when the processor 120 executes an operation of constructing the 3D model, if the processor 120 misjudges or wrongly defines a surface vector direction of each of the triangular planes of the hole contour of the 3D model 200, it causes a whole definition error of the vector directions of the second sub line segments 421-428. In other words, when the processor 120 of the present embodiment determines the second contour line segment of the sliced object 400, the processor 120 may actively correct the vector direction of the second contour line segment of the sliced image SI to the clockwise direction, such that the 3D printing device 130 may correctly print a position of the hole contour of the sliced object 400.

Figure 6:
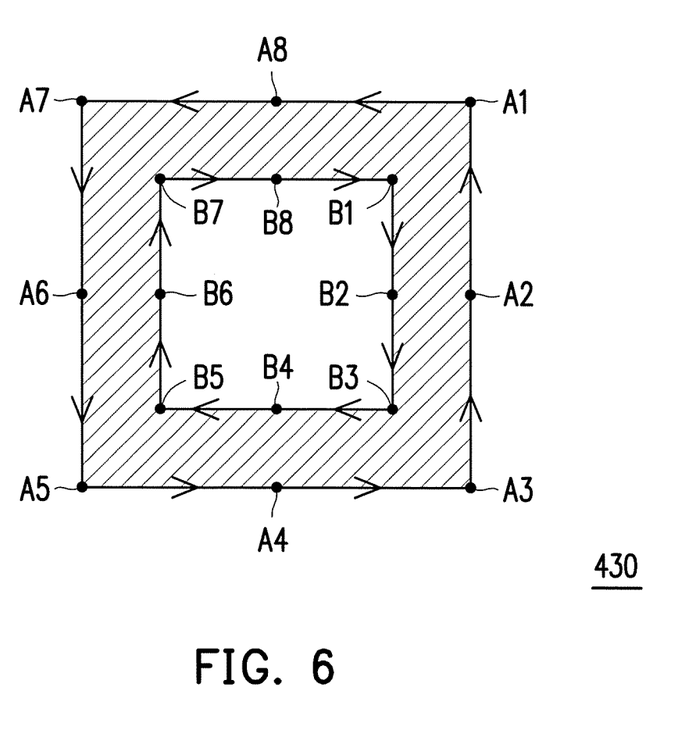
FIG. 6 is a schematic diagram of a combination of the first contour line segment and the second contour line segment according to the embodiment of FIG. 4.

FIG. 6 is a schematic diagram of a combination of the first contour line segment and the second contour line segment according to the embodiment of FIG. 4. Referring to FIG. 1, FIG. 4 and FIG. 6, the processor 120 may combine the sub line segment vectors of the first contour line segment 410 and the second contour line segment 420 to obtain a complete contour model 430 of the sliced object 400. In an actual printing situation, if the hole contour exists, there must be the outermost contour that surrounds the hole contour, so that the position of each point of the second contour line segment (the connection line of the endpoints B1-B8) are all located within the first contour line segment (the connection line of the endpoints A1-A8), as that shown in FIG. 6. Namely, first, the processor 120 determines the vector directions of each of the sub line segments of the outermost first contour line segment to determine whether the vector directions of each of the sub line segments of the outermost first contour line segment form the anticlockwise direction. Then, the processor 120 determines the vector directions of each of the sub line segments of the second contour line segment to determine whether the vector directions of each of the sub line segments of the second contour line segment form the clockwise direction. In this way, the processor 120 may aggregate sliced layer information of the anticlockwise first contour line segment (the outer contour) with sliced layer information of the clockwise second contour line segment (the hole contour), or subtract the sliced layer information of the anticlockwise first contour line segment by the sliced layer information of the anticlockwise second contour line segment to obtain an object shape of the sliced objet 400, so as to correctly perform the printing operation.

It should be noted that the object shape of the sliced object 400 of the present embodiment is not limited to the shape shown in FIG. 4. In an embodiment, the object shape of the sliced object 400 can be composed of a plurality of outer contours and a plurality of hole contours. Namely, according to the implementation of the aforementioned embodiment, the processor 120 may analyze the sliced object 400 of the sliced image SI to obtain a plurality of outer contour line segments and a plurality of hole contour line segments of the sliced object 400, wherein the outer contour line segments and the hole contour line segments are configured in interleaving. Moreover, started from the outermost contour, the outer contours and the hole contours of the sliced object 400 must be configured in interleaving, so that the processor 120 may determine whether the vector directions of the outer contour line segments and the hole contour line segments respectively form the anticlockwise direction and the clockwise direction (the contour line segments of the anticlockwise direction and the clockwise direction are configured in interleaving). If the vector directions of the outer contour line segments and the hole contour line segments do not respectively form the anticlockwise direction and the clockwise direction, the processor 120 re-defines the vector direction of at least one of the outer contour line segments and the hole contour line segments.

Figure 7A:
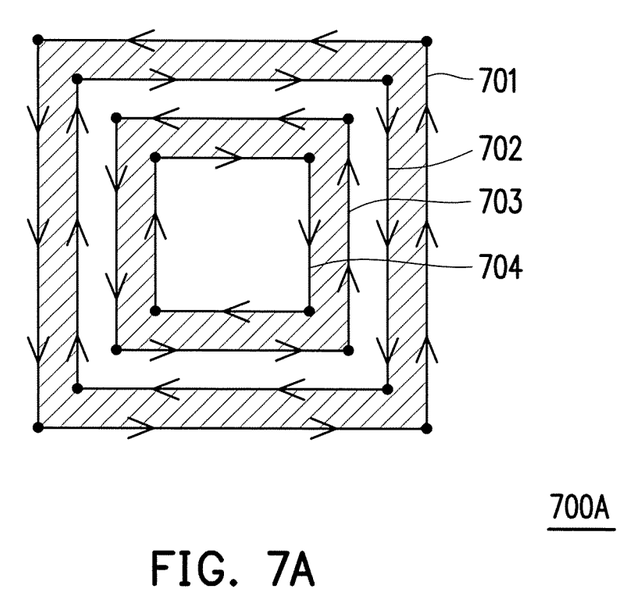
FIG. 7A is a schematic diagram of another sliced image according to an embodiment of the invention.

FIG. 7A is a schematic diagram of another sliced image according to an embodiment of the invention. Referring to FIG. 1 and FIG. 7A, in the present embodiment, the processor 120 performs the layer-slicing operation on a 3D model to obtain a sliced image, where the sliced image may include a sliced object 700A shown in FIG. 7A, where the sliced object 700A includes two different sub objects. The sliced object 700A may include a plurality of contour line segments 701, 702, 703 and 704. In the present embodiment, the processor 120 may first determine whether the sliced object 700A has a plurality of second contour line segments 702, 703 and 704 located within a region encircled by the first contour line segment 701. If the sliced object 700A has the second contour line segments 702, 703 and 704, and the second contour line segments surround each other one-by-one, the processor 120 further determines whether the vector directions of the first contour line segment 701 and the second contour line segments 702, 703 and 704 are alternately changed between the clockwise direction and the anticlockwise direction. For example, in an embodiment, the vector direction of the first contour line segment 705 is anticlockwise, and the vector directions of the second contour line segments 706, 707 and 708 are sequentially clockwise, anticlockwise, and clockwise. In the present embodiment, if the vector directions of the first contour line segment 701 and the second contour line segments 702, 703 and 704 are not alternately changed between the clockwise direction and the anticlockwise direction, the processor 120 corrects the vector direction of at least one of the first contour line segment 701 and the second contour line segments 702, 703 and 704.

In the present embodiment, the first contour line segment 701 and the second contour line segments 702, 703 and 704 surround each other one-by-one. Namely, the first contour line segment 701 is the outermost contour, the second contour line segment 702 is the hole contour, the second contour line segment 703 is the outer contour, and the second contour line segment 704 is the hole contour. Therefore, the processor 120 determines whether the vector directions of the contour line segments 701, 702, 703 and 704 are alternately changed between the clockwise direction and the anticlockwise direction. If the vector direction of at least one of the contour line segments 701, 702, 703 and 704 is incorrect, the processor 120 corrects the vector direction of at least one of the contour line segments 701, 702, 703 and 704, such that the 3D printing device 130 may correctly print the positions of the contour line segments 701, 702, 703 and 704 of the sliced object 700A.

Figure 7B:
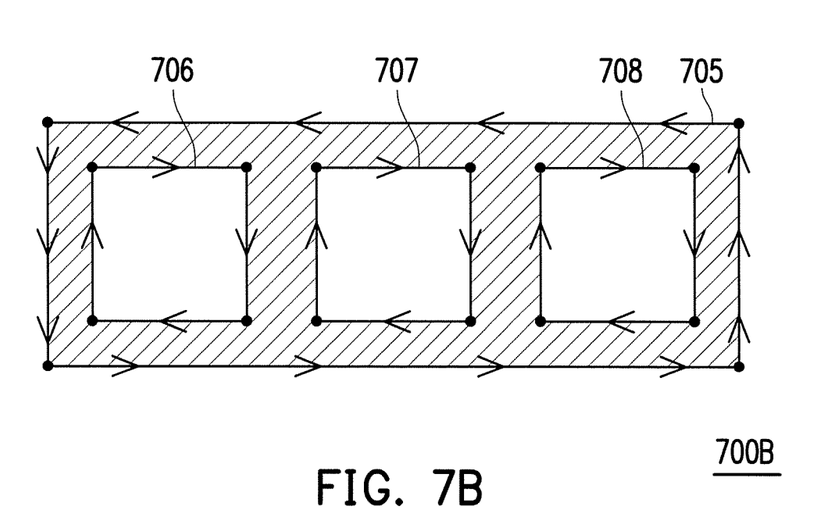
FIG. 7B is a schematic diagram of still another sliced image according to an embodiment of the invention.

FIG. 7B is a schematic diagram of still another sliced image according to an embodiment of the invention. Referring to FIG. 1 and FIG. 7B, in the present embodiment, the processor 120 performs the layer-slicing operation on a 3D model to obtain a sliced image, where the sliced image may include a sliced object 700B shown in FIG. 7B, where the sliced object 700B is a sub object. The sliced object 700B may include a plurality of contour line segments 705, 706, 707 and 708. In the present embodiment, the processor 120 may first determine whether the sliced object 700B has a plurality of second contour line segments 706, 707 and 708 located within a region encircled by the first contour line segment 705. If the sliced object 700B has the second contour line segments 706, 707 and 708, and the second contour line segments are separated from each other without surrounding, the processor 120 further determines whether the vector direction of the first contour line segment 705 is respectively opposite to the vector directions of the second contour line segments 706, 707 and 708. For example, in an embodiment, the vector direction of the first contour line segment 705 is anticlockwise, and the vector directions of the second contour line segments 706, 707 and 708 are all clockwise. In the present embodiment, when the vector directions of the first contour line segment 705 and at least one of the second contour line segments 706, 707 and 708 are not opposite, the processor 120 corrects the vector direction of at least one of the first contour line segment 705 and the second contour line segments 706, 707 and 708.

In the present embodiment, the first contour line segment 705 surrounds the second contour line segments 706, 707 and 708. Namely, the first contour line segment 705 is the outermost contour, and the second contour line segments 706, 707 and 708 are all the hole contours. Therefore, the processor 120 determines whether the vector directions of the second contour line segments 706, 707 and 708 are all opposite to the vector direction of the first contour line segment 705. If the vector direction of at least one of the contour line segments 705, 706, 707 and 708 is incorrect, the processor 120 corrects the vector direction of at least one of the contour line segments 705, 706, 707 and 708, such that the 3D printing device 130 may correctly print the positions of the contour line segments 705, 706, 707 and 708 of the sliced object 700B.

Figure 8:
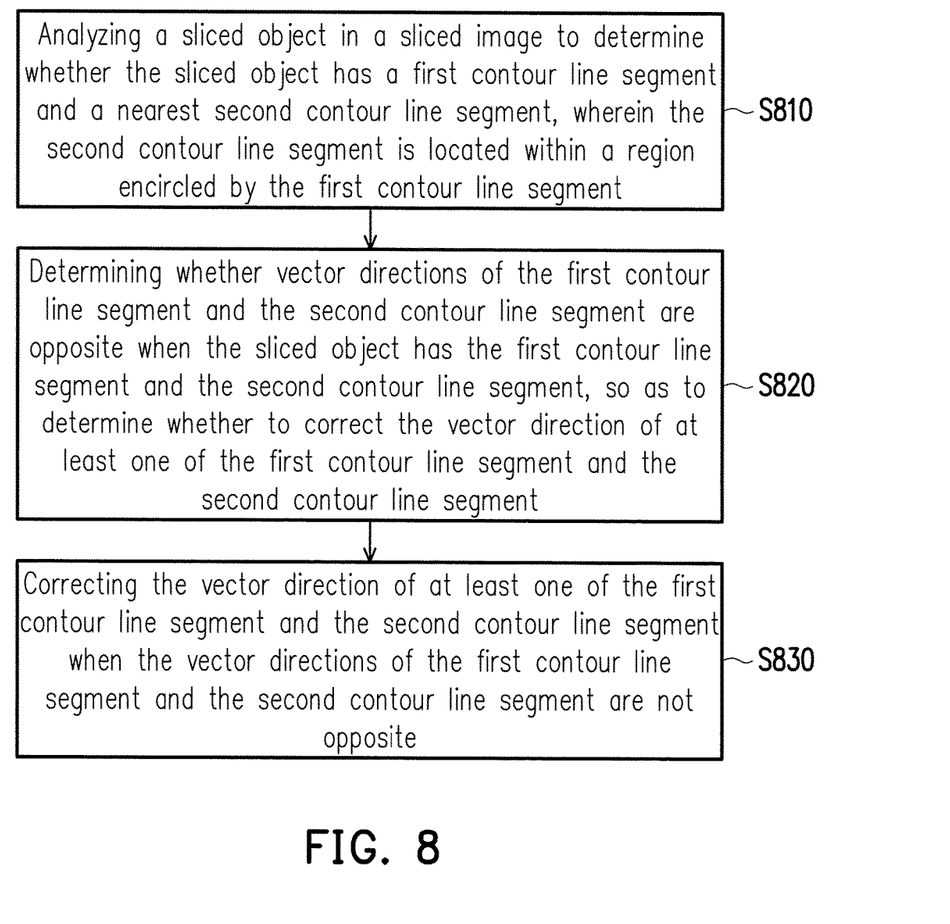
FIG. 8 is a flowchart illustrating a sliced image processing method according to an embodiment of the invention.

FIG. 8 is a flowchart illustrating a sliced image processing method according to an embodiment of the invention. Referring to FIG. 1 and FIG. 8, the sliced image processing method of the present embodiment is at least adapted to the 3D printing apparatus 100 of FIG. 1. In step S810, the processor 120 analyzes a sliced object in a sliced image to determine whether the sliced object has a first contour line segment and a nearest second contour line segment, where the second contour line segment is located within a region encircled by the first contour line segment. In step S820, when the sliced object has the first contour line segment and the second contour line segment, the processor 120 determines whether vector directions of the first contour line segment and the second contour line segment are opposite.

In step S830, if the vector directions of the first contour line segment and the second contour line segment are not opposite, the processor 120 corrects the vector direction of at least one of the first contour line segment and the second contour line segment. Therefore, the sliced image processing method of the present embodiment may effectively determine and correct the vector information of the contour line segments of the sliced object in the sliced image, such that the 3D printing device 130 may correctly perform the printing operation.

Moreover, since enough instructions and recommendations for related implementation details of the sliced image processing method and related device features of the present embodiment can be learned from description of the embodiments of FIG. 1 to FIG. 7B, detailed description thereof is not repeated.

In summary, the sliced image processing method and the 3D printing apparatus of the invention may effectively determine the contour line segments of the sliced object in the sliced image, and may correct the contour line segments of the sliced object in the sliced image, so as to correctly determine whether the contour line segments belong to the outer contours or the hole contours, and the 3D printing apparatus may correctly perform the printing operation. In this way, the sliced image processing method and the 3D printing apparatus of the invention may print 3D objects with good quality.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A sliced image processing method, comprising:
analyzing a sliced object in a sliced image to determine whether the sliced object has a first contour line segment and a nearest second contour line segment, wherein the second contour line segment is located within a region encircled by the first contour line segment;
determining whether vector directions of the first contour line segment and the second contour line segment are opposite when the sliced object has the first contour line segment and the second contour line segment; and
correcting the vector direction of at least one of the first contour line segment and the second contour line segment when the vector directions of the first contour line segment and the second contour line segment are not opposite.

2. The sliced image processing method as claimed in claim 1, wherein the vector directions of the first contour line segment and the second contour line segment are respectively a first direction and a second direction, and the corrected first direction is one of a clockwise direction and an anticlockwise direction, and the corrected second direction is the other one of the clockwise direction and the anticlockwise direction.

3. The sliced image processing method as claimed in claim 1, wherein the first contour line segment and the second contour line segment are respectively closed line segments, and the step of determining whether the vector directions of the first contour line segment and the second contour line segment are opposite comprises:
analyzing the first contour line segment and the second contour line segment to obtain a plurality of first sub line segment vectors of a plurality of first sub line segments and a plurality of second sub line segment vectors of a plurality of second sub line segments; and integrating a connecting sequence of vector directions of the first sub line segment vectors to form a first direction, and integrating a connecting sequence of vector directions of the second sub line segment vectors to form a second direction.

4. The sliced image processing method as claimed in claim 3, further comprising:

defining the first contour line segment as an outermost contour of the sliced object when the region encircled by the first contour line segment comprises the second contour line segment; and determining whether the first direction is one of the clockwise direction and the anticlockwise direction, and re-defining the vector directions of the first sub line segment vectors when the first direction is not one of the clockwise direction and the anticlockwise direction.

5. The sliced image processing method as claimed in claim 4, further comprising:

defining the second contour line segment as a hole contour of the sliced object when the second contour line segment is located within the region encircled by the first contour line segment; and determining whether the second direction is the other one of the clockwise direction and the anticlockwise direction, and re-defining the vector directions of the second sub line segment vectors when the second direction is not the other one of the clockwise direction and the anticlockwise direction.

6. The sliced image processing method as claimed in claim 3, further comprising:

analyzing a three-dimensional object to construct a three-dimensional model image, wherein the three-dimensional model image is complied with a stereolithography file format; and slicing a three-dimensional model in the three-dimensional model image to obtain the sliced image.

7. The sliced image processing method as claimed in claim 6, wherein the three-dimensional model in the three-dimensional model image is composed of a plurality of triangular planes, and the triangular planes respectively have a plurality of corresponding surface vectors, wherein the step of analyzing the sliced object in the sliced image comprises:

determining the vector directions of the first sub line segment vectors according to the surface vectors of the triangular planes of the three-dimensional model respectively corresponding to the first sub line segments; and determining the vector directions of the second sub line segment vectors according to the surface vectors of the triangular planes of the three-dimensional model respectively corresponding to the second sub line segments.

8. The sliced image processing method as claimed in claim 1, further comprising:

analyzing the sliced object in the sliced image to determine whether the sliced object has a plurality of second contour line segments located in the region encircled by the first contour line segment;

determining whether the vector directions of the first contour line segment and the second contour line segments are alternately changed between the clockwise direction and the anticlockwise direction when the sliced object has the second contour line segments, and the second contour line segments surround each other one-by-one; and correcting the vector direction of at least one of the first contour line segment and the second contour line segments when the vector directions of the first contour line segment and the second contour line segments are not alternately changed between the clockwise direction and the anticlockwise direction.

9. The sliced image processing method as claimed in claim 1, further comprising:

analyzing the sliced object in the sliced image to determine whether the sliced object has a plurality of second contour line segments located within the region encircled by the first contour line segment;

determining whether the vector direction of the first contour line segment is respectively opposite to the vector directions of the second contour line segments when the sliced object has the second contour line segments, and the second contour line segments are separated from each other without surrounding; and correcting the vector direction of at least one of the first contour line segment and the second contour line segments when the vector directions of the first contour line segment and at least one of the second contour line segments are not opposite.

10. A three-dimensional printing apparatus, comprising:

a storage device, storing a sliced image and a plurality of modules; and a processor, coupled to the storage device, and executing the modules to:

analyze a sliced object in the sliced image to determine whether the sliced object has a nearest first contour line segment and a second contour line segment, wherein the second contour line segment is located within a region encircled by the first contour line segment;

determine whether vector directions of the first contour line segment and the second contour line segment are opposite when the sliced object has the first contour line segment and the second contour line segment; and determine whether to correct the vector direction of at least one of the first contour line segment and the second contour line segment when the vector directions of the first contour line segment and the second contour line segment are not opposite.

11. The three-dimensional printing apparatus as claimed in claim 10, wherein the vector directions of the first contour line segment and the second contour line segment are respectively a first direction and a second direction, and the corrected first direction is one of a clockwise direction and an anticlockwise direction, and the corrected second direction is the other one of the clockwise direction and the anticlockwise direction.

12. The three-dimensional printing apparatus as claimed in claim 10, wherein the first contour line segment and the second contour line segment are respectively closed line segments, and the processor analyzes the first contour line segment and the second contour line segment to obtain a plurality of first sub line segment vectors of a plurality of first sub line segments and a plurality of second sub line segment vectors of a plurality of second sub line segments, wherein the processor integrates a connecting sequence of vector directions of the first sub line segment vectors to form a first direction, and integrates a connecting sequence of vector directions of the second sub line segment vectors to form a second direction.

13. The three-dimensional printing apparatus as claimed in claim 12, wherein when the region encircled by the first contour line segment comprises the second contour line segment, the processor defines the first contour line segment as an outermost contour of the sliced object, and the processor determines whether the first direction is one of the clockwise direction and the anticlockwise direction, and when the first direction is not one of the clockwise direction and the anticlockwise direction, the processors re-defines the vector directions of the first sub line segment vectors.

14. The three-dimensional printing apparatus as claimed in claim 13, wherein when the second contour line segment is located within the region encircled by the first contour line segment, the processor defines the second contour line segment as a hole contour of the sliced object, and the processor determines whether the second direction is the other one of the clockwise direction and the anticlockwise direction, and when the second direction is not the other one of the clockwise direction and the anticlockwise direction, the processor re-defines the vector directions of the second sub line segment vectors.

15. The three-dimensional printing apparatus as claimed in claim 12, wherein the processor further executes the modules to:
  analyze a three-dimensional object to construct a three-dimensional model image, wherein the three-dimensional model image is complied with a stereolithography file format; and
  slice a three-dimensional model in the three-dimensional model image to obtain the sliced image.

16. The three-dimensional printing apparatus as claimed in claim 15, wherein the three-dimensional model in the three-dimensional model image is composed of a plurality of triangular planes, and the triangular planes respectively have a plurality of corresponding surface vectors, wherein an operation of analyzing the sliced object in the sliced image comprising:
  determining the vector directions of the first sub line segment vectors according to the surface vectors of the triangular planes respectively corresponding to the first sub line segments; and
  determining the vector directions of the second sub line segment vectors according to the surface vectors of the triangular planes of the three-dimensional model respectively corresponding to the second sub line segments.

17. The three-dimensional printing apparatus as claimed in claim 10, wherein the processor further executes the modules to:
  analyze the sliced object in the sliced image to determine whether the sliced object has a plurality of second contour line segments located within the region encircled by the first contour line segment;
  determine whether the vector directions of the first contour line segment and the second contour line segments are alternately changed between the clockwise direction and the anticlockwise direction when the sliced object has the second contour line segments, and the second contour line segments surround each other one-by-one; and
  correct the vector direction of at least one of the first contour line segment and the second contour line segments when the vector directions of the first contour line segment and the second contour line segments are not alternately changed between the clockwise direction and the anticlockwise direction.

18. The three-dimensional printing apparatus as claimed in claim 10, wherein the processor further executes the modules to:
  analyze the sliced object in the sliced image to determine whether the sliced object has a plurality of second contour line segments located within the region encircled by the first contour line segment;
  determine whether the vector direction of the first contour line segment is respectively opposite to the vector directions of the second contour line segments when the sliced object has the second contour line segments, and the second contour line segments are separated from each other without surrounding; and
  correct the vector direction of at least one of the first contour line segment and the second contour line segments when the vector directions of the first contour line segment and at least one of the second contour line segments are not opposite.

* * * * *